C. & W. H. MAYNARD.
SADDLE.
APPLICATION FILED JULY 8, 1912.

1,053,419.

Patented Feb. 18, 1913.

Witnesses
W. H. Brereton
M. B. Costello

Inventors
Charley Maynard
and Walter H. Maynard
by J. B. Crallé
Attorney

UNITED STATES PATENT OFFICE.

CHARLEY MAYNARD AND WALTER H. MAYNARD, OF BELOIT, KANSAS.

SADDLE.

1,053,419.  Specification of Letters Patent.  Patented Feb. 18, 1913.

Application filed July 8, 1912. Serial No. 708,257.

*To all whom it may concern:*

Be it known that we, CHARLEY MAYNARD and WALTER H. MAYNARD, both citizens of the United States, residing at Beloit, in the county of Mitchell and State of Kansas, have invented new and useful Improvements in Saddles, of which the following is a specification.

This invention relates to certain new and useful improvements in saddles, and relates more particularly to saddles used in connection with motor-cycles and the like.

The object of the invention is to provide an improved, simplified and efficient saddle which is possessed of maximum resiliency in absorbing the shocks and jars incident to riding.

Figure 1:
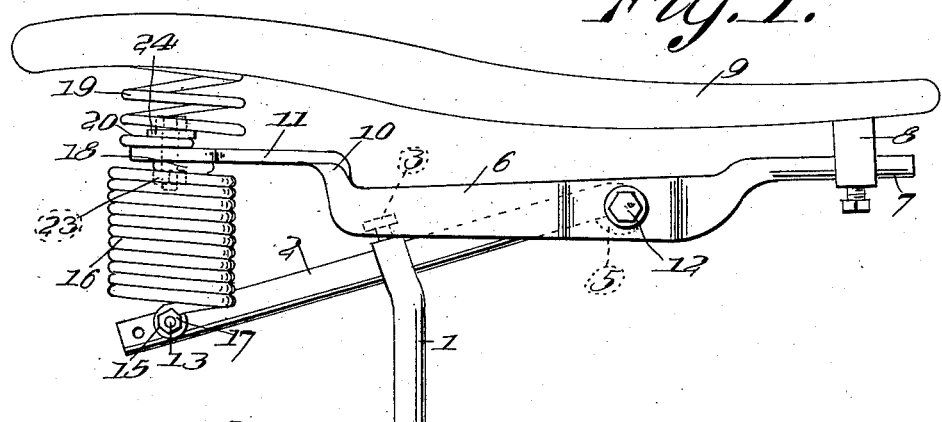
Figure 2:
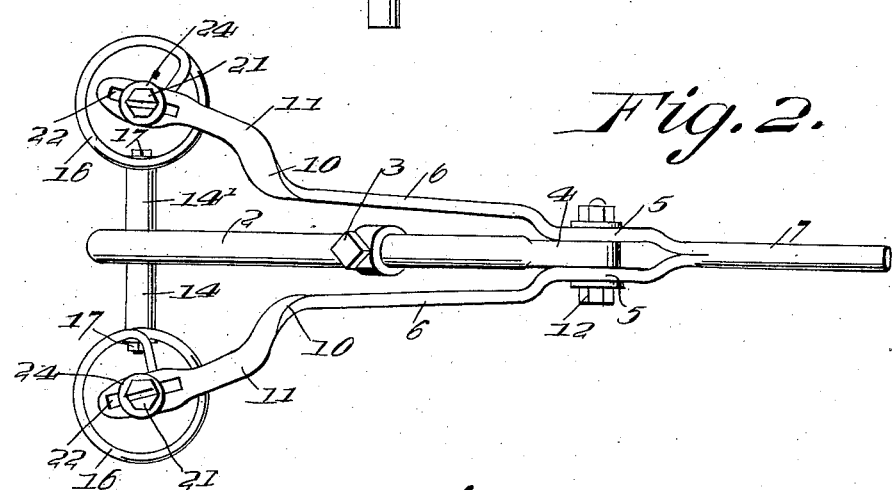
Figure 3:
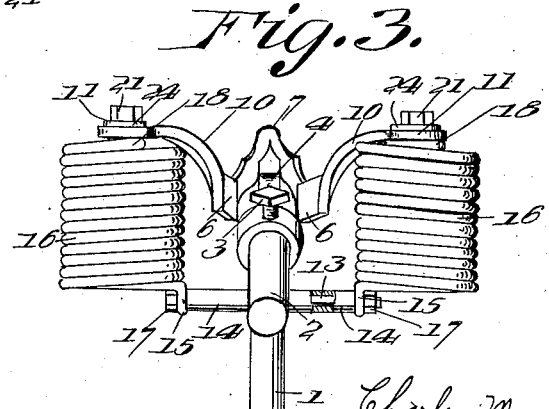

In the drawings: Figure 1 is a side elevation of the invention; Fig. 2 is a top plan view with the seat removed; and Fig. 3 is a rear elevation.

The saddle post 1 has a rearwardly and downwardly inclined rod 2 adjustably secured thereto at its upper end by a set screw 3. The front end of the rod 2 is provided with an enlarged flattened portion 4 which engages in the space between the contracted portions 5 of the forks 6. The forks 6 merge into a substantially horizontal bar 7 which is engaged with the clamp member 8 carried by the seat or saddle proper 9. The forks 6 diverge at their rear ends and are directed upwardly and twisted at 10, and are then further extended rearwardly to provide horizontal arms 11. A bolt 12 pivotally secures the flattened enlarged portion of the rod 2 to the contracted portions 5, 5, of the forks 6. The rear end of the rod 2 is perforated to receive a bolt 13 which latter has its ends extending on opposite sides of the rod 2. Spacing sleeves 14 are received over the ends of bolt 13 and abut opposite sides of the rod 2, the outer ends of the sleeves 14 being engaged by the hook-shaped portions 15 formed on the lower ends of a pair of coil springs 16, the hook-shaped portions 15 being engaged by nuts 17, which clamp the same against the outer ends of the spacing sleeves 14.

The upper end of each spring is turned inwardly and formed with a hook-shaped portion 18 that engage the under faces of arms 11. Short coil springs 19 are placed beneath the seat 9 and have hook shaped ends 20 which seat on the upper faces of the arms 11. Bolts 21 are passed through elongated slots 22 formed in the outer ends of the horizontal arms 11 and are engaged with the hook shaped portions 18 and 20 of the coil springs 16 and 19 respectively. Nuts 23, shown in dotted lines in Fig. 1 are placed on the lower ends of the bolts 21 and bind against the hook-shaped portions 18 to clamp the springs 16 to arms 11. Washers 24 may be used between the slotted heads of bolts 21 and the hook shaped portions 20 of the springs 19.

From the above it will be apparent that the forks 6 may have pivotal movement about the bolt 12, and in their up and down movements expand and contract the springs 16, which latter are rigidly connected at their lower ends to the rod 2 of the seat post 1. The springs 19 that are interposed between the arms 11 of forks 6 and the seat 9, further provide a resilient support for the seat, as is apparent.

What is claimed is:

1. In combination with a post and a substantially horizontal rod carried thereby, a forked member receiving one end of said rod between its forks and being pivotally secured thereto, said forks at one end merging into a horizontal bar, a seat secured at its front end to said bar, the rear ends of said forks being turned upwardly and twisted and extended rearwardly to form horizontal arms, a horizontal bolt carried by the rear end of the horizontal rod and extending on opposite sides thereof, spacing sleeves on the ends of said bolt abutting the horizontal rod on opposite sides thereof, a pair of coil springs secured at one end to said bolts and abutting said spacing sleeves and having their opposite ends secured to the end portions of said horizontal arms, and a second pair of coil springs disposed between the horizontal arms and the seat at the rear end of the latter.

2. In combination with a post and a substantially horizontal rod carried thereby, a forked member receiving one end of said rod between its forks and being pivotally secured thereto, said forks at one end merging into a horizontal bar, a seat secured at its front end to said bar, the rear ends of said forks being turned upwardly and twisted and extended rearwardly to form horizontal arms, coil springs between said horizontal arms and the rear end of the seat, and coil springs connected to the horizontal arms and to the opposite end of the horizontal rod.

3. In combination with a post and a substantially horizontal rod secured thereto between the ends of the latter, a transverse element secured to the rear end of the horizontal rod, a member pivoted to the front end of said horizontal rod and having its rear portion overlying said transverse element in spaced relation thereto, coil springs connected to and disposed in the space between said element and the said rear portion of said member, and a seat connected to said member.

4. In combination with a post and a substantially horizontal rod secured thereto between the ends of the latter, a transverse element secured to the rear end of the horizontal rod, a member pivoted to the front end of said horizontal rod and having its rear portion overlying said transverse element in spaced relation thereto, coil springs connected to and disposed in the space between said element and the said rear portion of said member, second coil springs connected to and overlying the rear portion of said member, and a seat secured at one end to said last named coil springs and at its opposite end being connected to the front end of said member.

5. In combination with a post and a transverse rod secured thereto, a seat carrying member pivoted between its ends to said rod and having its rear portion overlying the rear end of the rod in spaced relation thereto, and springs in said space connected to the rod and seat carrying member.

6. In combination with a supporting element, a member pivotally connected thereto, spring means between one end of said member and the supporting element, a seat connected to the opposite end of said member, and springs between the rear end of the seat and said member.

In testimony whereof we have hereunto set our hands in presence of two subscribing witnesses.

CHARLEY MAYNARD.
WALTER H. MAYNARD.

Witnesses:
CLARENCE O. TIMMONS,
EDWARD B. TIMMONS.

Copies of this patent may be obtained for five cents each, by addressing the "Commissioner of Patents, Washington, D. C."